C. E. FOOTE.
TRACTION DRIVING AND STEERING MECHANISM FOR TRACK LAYING TRACTORS.
APPLICATION FILED OCT. 13, 1919.

1,356,615.

Patented Oct. 26, 1920.
3 SHEETS—SHEET 1.

Inventor:
Charles E. Foote,
by Parker Cook,
Atty.

C. E. FOOTE.
TRACTION DRIVING AND STEERING MECHANISM FOR TRACK LAYING TRACTORS.
APPLICATION FILED OCT. 13, 1919.

1,356,615.

Patented Oct. 26, 1920.
3 SHEETS—SHEET 2.

Inventor:
Charles E. Foote,
by Parker Cook
Atty.

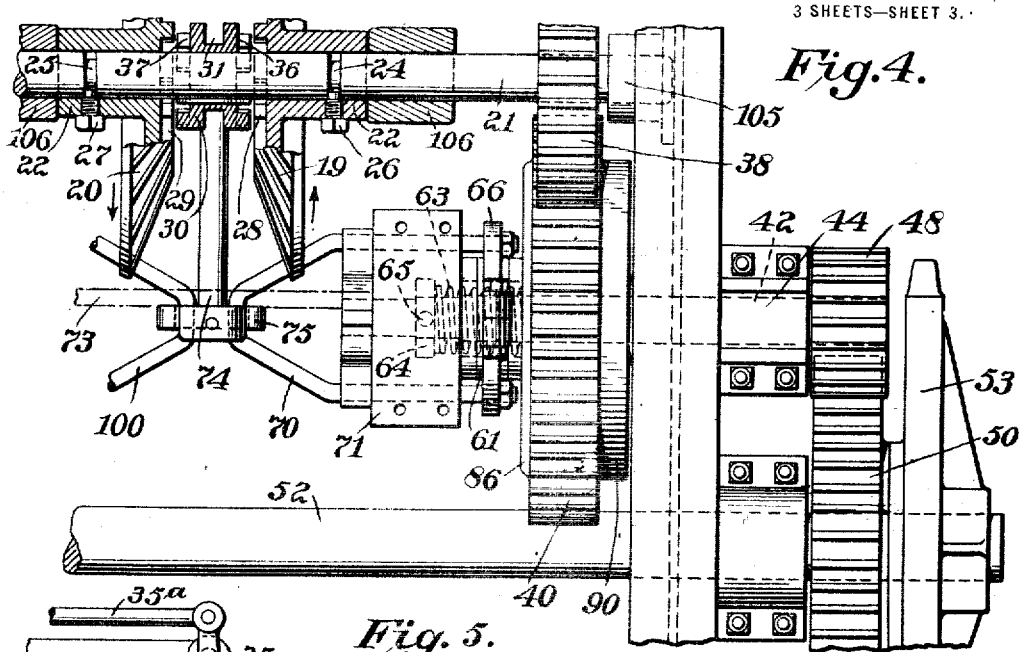
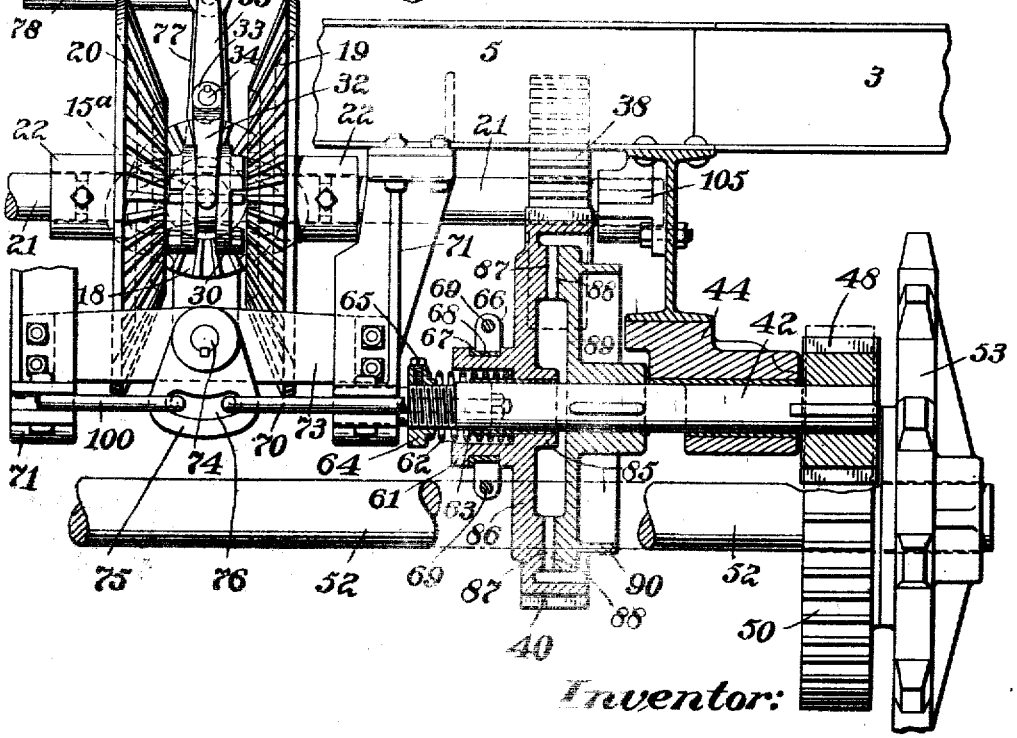

UNITED STATES PATENT OFFICE.

CHARLES E. FOOTE, OF NUNDA, NEW YORK, ASSIGNOR TO THE FOOTE COMPANY, OF NUNDA, NEW YORK, A CORPORATION OF NEW YORK.

TRACTION DRIVING AND STEERING MECHANISM FOR TRACK-LAYING TRACTORS.

1,356,615.         Specification of Letters Patent.    Patented Oct. 26, 1920.

Application filed October 13, 1919. Serial No. 330,316.

*To all whom it may concern:*

Be it known that I, CHARLES E. FOOTE, a citizen of the United States, residing at Nunda, in the county of Livingston and State of New York, have invented certain new and useful Improvements in Traction Driving and Steering Mechanism for Track-Laying Tractors, of which the following is a specification.

My invention relates to a new and useful improvement in steering and traction driving mechanisms for track laying tractors and in the present instance is shown incorporated in a tractor on which there is to be carried a superstructure capable of performing other work than that of a tractor; that is, in the present instance the invention is combined in a tractor on which there is mounted a paver or mixer.

An object of the present invention is to so construct the traction driving and steering mechanism that the movement of the tractor from a straight path to a curved one, and in either direction, is accomplished by the shifting of but one lever.

Another object of my invention is to so construct a traction driving mechanism wherein the machine may be run at full speed or half speed in both forward and rearward directions, and may be steered either in the forward or rearward direction while running at half or full speed by the movement either to the right or left of one lever.

Still another object of my invention is to provide a steering and traction driving mechanism that is to be incorporated in a tractor whereby the movement of an operating lever will cause a clutch either on the left or right hand side of the tractor to disengage one traction member thereby causing the machine to turn about the idle traction member as an axis.

Still another object of my invention is to provide a driving and steering mechanism wherein a clutch is provided for each of the traction members and wherein when the machine is to be run in a straight path either forward or rearward both of the clutches will be normally engaged, and when it is desired to turn, either of the clutches as desired may be readily disengaged by the movement of but one lever to thereby cause the machine to turn as desired.

Still another object of my invention is to provide a controlling and traction driving mechanism consisting of high and low speeds, reverse in both high and low speeds, and steering mechanism, all to be operated by a minimum number of levers so that the tractor may be easily and quickly manipulated as the occasion may require.

Still another object of my invention is to provide a driving and controlling mechanism for a track laying tractor designed especially to carry a superstructure, that is relatively light in weight, compact in form, easily operated and controlled, and steered by the operation of one lever.

With these and other objects in view, my invention consists in certain new and novel arrangements and combination of parts as will be hereinafter more fully described and pointed out in the claims.

In the drawings:

Fig. 4 is a detail plan of a part of the controlling and traction driving mechanism, a part being shown in section;

Fig. 5 is a rear elevation, partly in section of the same structure; and

Generally speaking the invention consists of a suitable frame on which there is to be mounted an engine for propelling the tractor, which is of a track laying type, and therefore is provided with two endless chains or treads, the engine delivering power through the crank shaft to a gear which in turn meshes with a gear that is located on a drive shaft, on which there is mounted a clutch and also high and low selective gears which in turn operate a propeller shaft on which a drive pinion is shown, which in turn meshes with two idle transmission gears which are mounted on a cross shaft, a face or jaw clutch being interposed between them which is located on the shaft, it however being capable of a lateral movement, so that this last mentioned shaft will turn in either one direction or the other depending on which of the two bevel gears of the transmission it is locked to.

On the ends of this cross shaft are pinions which in turn each mesh with a gear having an internal clutch therein, one part of each clutch being connected to a stub shaft on which is mounted a pinion which in turn meshes with a large drive gear on the axle to which gear is secured a drive sprocket over which run the traction chains.

To the inner ends of the internal clutches are secured yoke bars that are in turn secured to a rocker arm that is mounted on a longitudinal shaft to which is secured the main steering lever.

On a movement of this longitudinal shaft, the rocker arm will disengage one of the clutches on the stub shaft, depending on which way the rocker arm is moved, which will cause one of the traction members to remain idle, thereby forcing the machine around the idle traction member.

To reverse the machine it is only necessary that the other of the transmission gears be locked to the cross shaft which will cause this shaft to rotate in an opposite direction, thereby causing the machine to proceed in a rearward movement rather than in a forward one.

Figure 1:
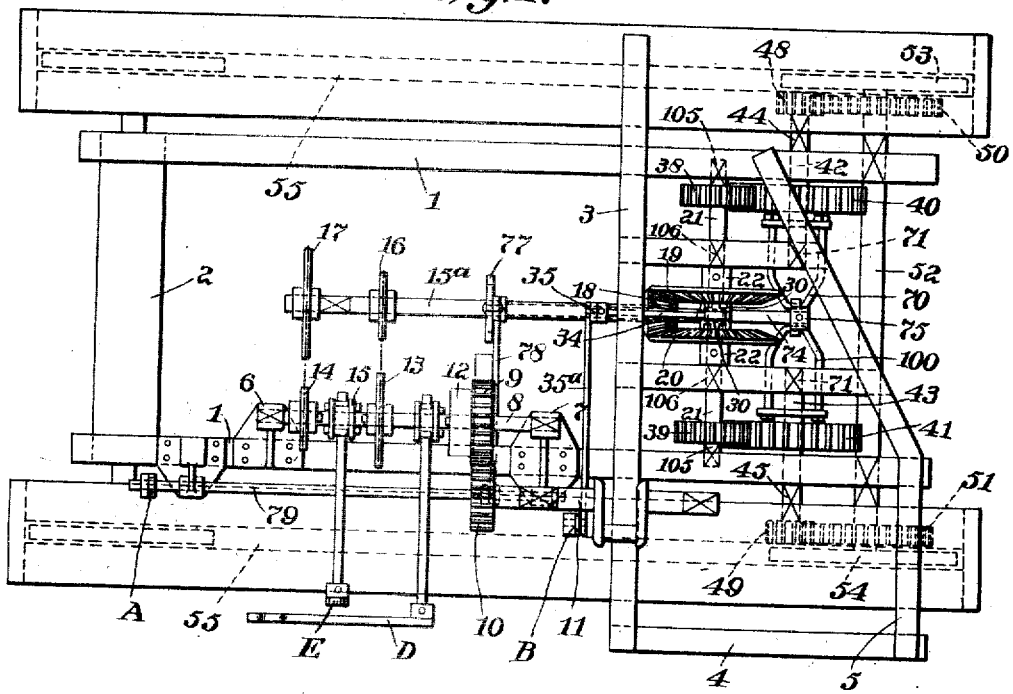
Figure 1 is a top plan view of my improved steering and traction driving mechanism, the view being partly diagrammatic.
Figure 2:
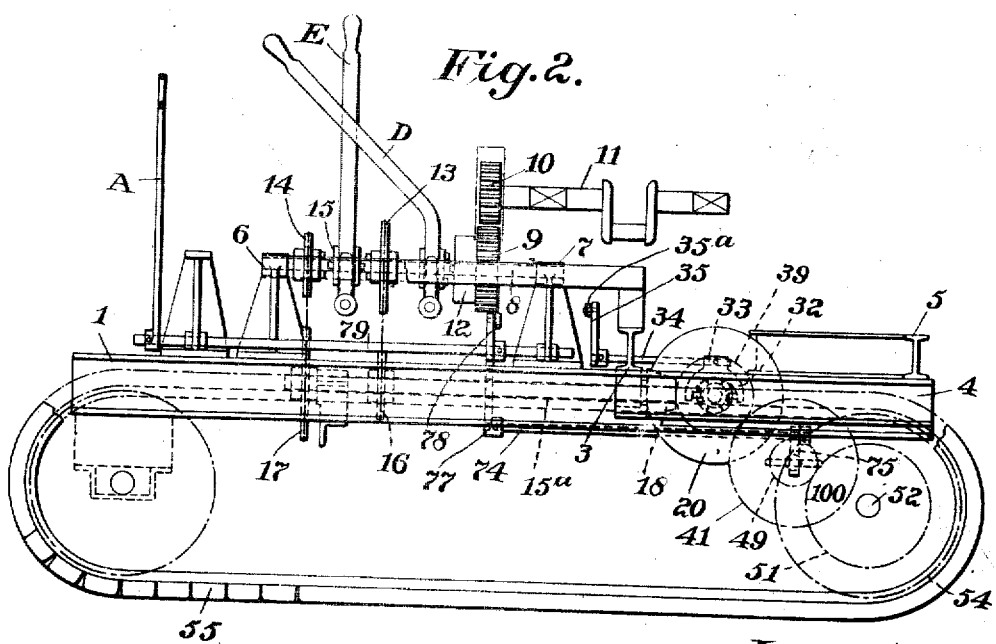
Fig. 2 is a side elevation and also diagrammatic in character.
Figure 3:
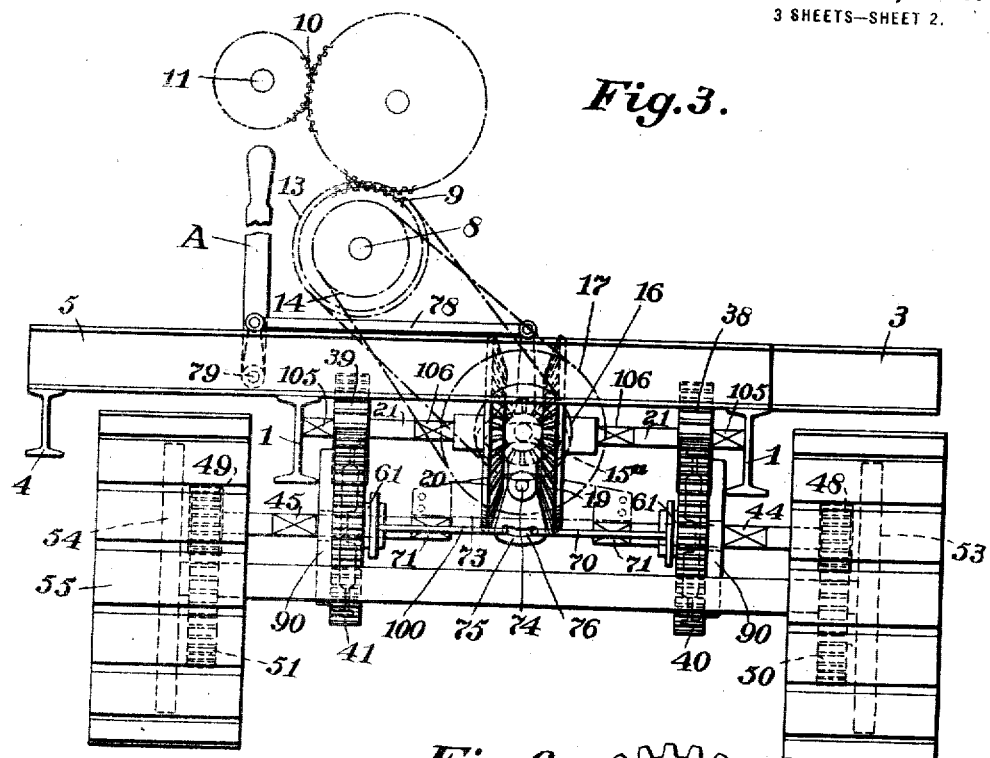
Fig. 3 is a rear elevation, a part of the same being in diagrammatic outline.

Referring now the the drawings and to a specific and detail construction of my improved steering and traction driving mechanisms, it might first be mentioned that Figs. 1, 2 and 3 are of a diagrammatic nature, as the framework or body of the tractor is not a part of the invention and the steering and driving or controlling mechanisms might easily be applied or set in a frame of different form or configuration.

In the present drawings, however, which show one embodiment of my invention there is provided a frame having the longitudinal side members 1 and the forward end piece 2, while a cross member 3 is also shown to which there is attached the other members of the frame 4 and 5.

Suitably mounted in bearings 6 and 7 is a shaft 8 which is provided with a pinion 9 which meshes with a gear of a mixer, which in turn meshes with a pinion 10 mounted on the end of the crankshaft 11 of an engine (not shown).

On this shaft is mounted an internal clutch 12 which is operated by the lever or handle D, and also loosely mounted on this shaft are the high-speed sprocket 13 and the low speed sprocket 14. These are in turn thrown into and out of locking engagement by the movement of a lever E which operates a jaw clutch 15, having locking jaws on its opposite faces. A movement of this handle E forwardly, for instance, will cause the high or the larger gear 13 to lock on the shaft 8, and a movement in the opposite direction will cause the other gear 14 to come into operative position.

A propeller shaft 15ª longitudinally arranged with respect to the frame and also centrally located therewith is also shown, on which there are provided the sprockets 16 and 17, the high speed sprocket in this instance of course being the smaller one and the low speed sprocket 17 being the large one. These two sprockets in this instance, however, are rigidly locked or keyed to the shaft 15ª, and suitable sprocket chains are passed thereover, which also pass over the high and low speed sprocket gears 13 and 14 on the shaft 8, so that this shaft 15ª will travel at one rate or the other depending on whether the high or low sprocket 13 or 14 is thrown into operation.

Located on the end of the propeller shaft 15ª is the drive pinion 18, which in turn is designed to mesh with the two bevel transmission gears 19 and 20, which are loosely mounted on a cross shaft 21. This shaft 21 is suitably mounted at its opposite ends in the bearings 105, which bearings are secured to the longitudinal members 1 of the frame and also are supported in two bearings 106, which bearings are likewise secured to the main frame. The transmission gears 19 and 20 are also provided with outwardly extending hubs 22 which may abut against the bearings 106 to thereby prevent any lateral movement of the transmission gears.

I have also shown in the drawings small slots 24 and 25 formed on the shaft 21 so that keys 26 and 27 may be used if desired, to be passed through the aforementioned hubs and to rest in the aforementioned slots to further provide against any lateral movement of these transmission gears.

These transmission gears are both always in mesh with the pinion 18 and of course revolve in the opposite direction. They are respectively provided with the clutch jaws 28 and 29 on their inner faces, and locked on the shaft 21 against rotation but capable of a lateral or shifting movement is located the jaw clutch 30 which is interposed between the two aforementioned transmission gears, this clutch is provided with a groove 31, into which extends the yoke or bifurcated lever 32, which is pivoted in a suitable manner as at 33, and secured to the upper end of this lever is the shaft 34 which in turn is operated by the movement of an arm 35 to which is connected a link 35ª controlled by an operating lever or handle B.

This jaw clutch 30 is provided with the two locking faces 36 and 37 so that a shifting movement of the clutch to the right (Fig. 4) will cause the face 36 to lock with the jaw 28 on the transmission gear 19 and thereby cause the gear and shaft 21 to travel in the direction of the arrow shown in Fig. 5 to drive the tractor in one direction, while a movement of the lever B in the other direction will disengage the aforementioned face and cause the opposite face of the clutch 30 to lock with the face of the other gear 20 and as the pinion is driving this in the opposite direction the gear 20 and shaft 21 will revolve in the opposite direction, which will likewise, of course, cause the machine to be driven in the opposite or reverse direction. In other words the forward or rearward movement of the tractor is determined by the direction in which the shaft 21 revolves and this direction is accomplished by locking the jaw clutch with one or the other of the oppositely revolving transmission gears 19 and 20.

Located near the opposite ends of the shaft 21 are the pinions 38 and 39 which are in this instance connected to the aforementioned shaft and which in turn always mesh with the large annular gears which are parts of internal clutches 40 and 41 and each of which gears is loosely mounted on the stub axles 42 and 43. A description of these two clutches will shortly follow.

These stub axles are securely mounted in suitable bearings 44 and 45, which are secured to the main frame and the inner ends of said axles are mounted in hangers 71.

On the outer ends of these stub axles are the further pinions 48 and 49 which mesh with the driving gears 50 and 51 which are both rotatably mounted on the main axle 52, and secured to these gears respectively and sprocket wheels 53 and 54 over which pass the tractor treads or endless tractor chains 55.

As the two internal clutches 40 and 41 are identical in all respects a description of but one will be set out.

The clutch 40 is formed in two parts, the outer periphery being provided with teeth which are designed to mesh with the pinion 38 located on the shaft 21 as heretofore mentioned, and a central hub 85 is provided through which the stub axle 42 extends. From the hub to the periphery is the body portion or plate 86 which is provided on its outer face with the annularly arranged teeth 87 which are designed to be normally in mesh with similar teeth 88 that are formed on the inner part 89 of the clutch member 40 which is keyed to the stub axle 42, this inner portion 89 of the clutch being slightly less in diameter than the first mentioned portion so that it practically fits within the same as is clearly seen in Fig. 5.

Figure 6:
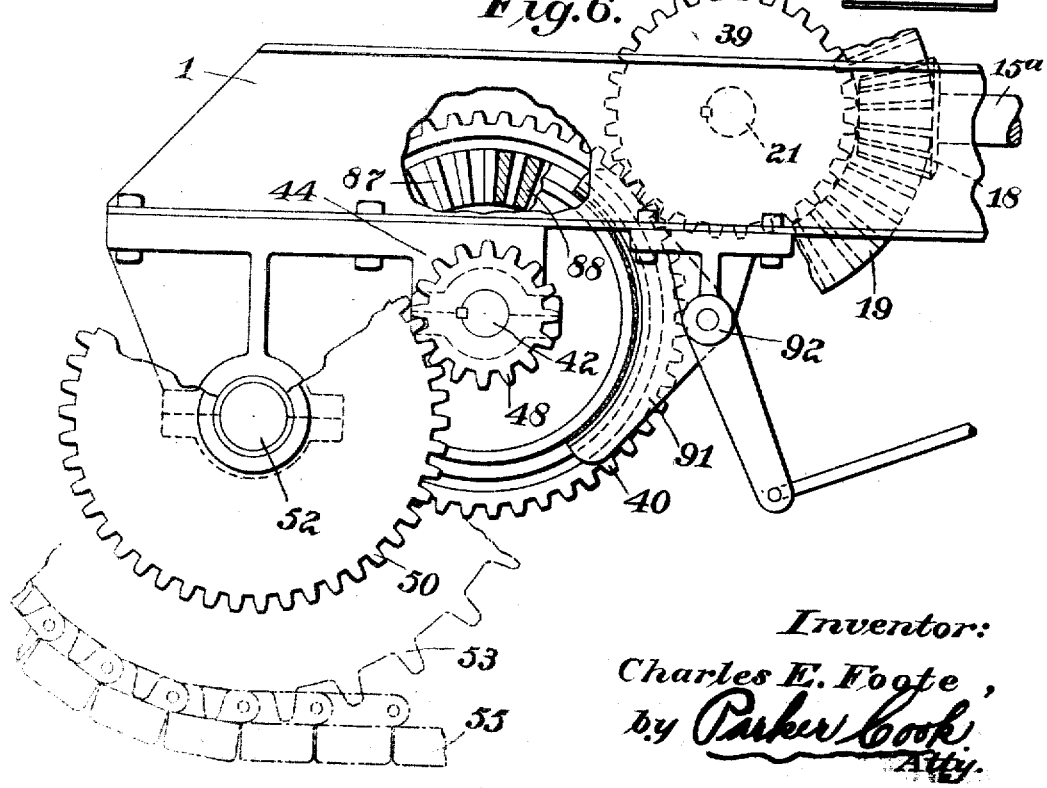
Fig. 6 is a side elevation of the rear portion, parts being broken away for the sake of clearness.

This inner portion 89 of the clutch 40 is provided with an integral brake band 90 against which is secured a brake-shoe 91 as shown in Fig. 6, and a brake hanger 92 and operable means are shown for applying the same (Fig. 6).

Again referring to the clutch 40 it will be noticed that the plate or body 86 is provided with an outwardly extending flanged portion 61 which forms an inner pocket or recess 62 in which there is designed to be placed a relatively strong spring 63 which bears at its opposite end against the collar 64 which is firmly threaded on the inner end of the stub axle 42 and which may be adjusted by the use of a set screw 65 which is placed within the collar.

Means are shown for disengaging this clutch which consists of a two-piece strap or neck-yoke 66, which is located within the channel or ring 67 formed on the outer periphery of the flanged portion 61, the bearing 68, however, being first inserted in said ring portion to prevent any friction between the yoke and the flanged portion. This yoke may be placed in position and the parts securely locked by the bolts and nuts 69.

Secured in the ends of this yoke 66 are the two ends of a yoke rod 70 which rod is suitably supported in the bearing or hanger 71 heretofore mentioned.

Secured to these hangers 71 is the cross arm 73 through which is passed a rock shaft 74 on the outer end of which is a rock arm 75, provided with the arcuate slot 76 through which passes the yoke bar 70 and a like yoke bar for the other clutch 41.

It is to be remembered that although only one of these clutches has been described, the other one is identical therewith and a similar yoke rod 100 for the manipulation of the same fits into the arcuate slot 76 of the rocker arm, as shown in the drawings.

To operate this rock shaft 74 and the rocker arm 75 located at the outer end thereof a lever 77 (Figs. 2 and 5) is connected to said shaft which lever is enlarged near its central portion and bifurcated so that the propeller shaft 15ª may pass therethrough, and this lever is suitably pivoted so that a movement to the left or right will cause the rock shaft 74 to rock in either the one direction or the other thereby causing the rocking arm to disengage one of the two clutches 40 or 41 depending on the direction in which the lever 74 is moved. It is to be remembered that each clutch is normally engaged with its inner part the latter being keyed to the stub axle 42, the springs 63 normally pressing and holding the clutches in their operative position.

Pivoted to the upper end of the lever 77 is a control rod 78 which in turn is operated by a further rod 79 and lever A.

Therefore a movement of this handle A forcing the upper end of the lever 77 (Figs. 3 and 5) say to the right would cause the rocker arm to be forced to the left, which in turn would pull the yoke rod 70 to the left, which would pull the outer portion of the clutch 40 inwardly thereby removing the teeth 87 from engagement with the teeth 88 on the inner keyed portion of the clutch which would thereby prevent a driving movement from being transmitted to the sprocket 48 on the stub axle 42, so that in turn no driving motion would be transmitted to the large driving sprocket 53 thereby causing the tractor to turn about the idle traction member substantially as an axis.

On the other hand had the lever 77 caused the rocker arm to swing to the right, the left hand clutch would have become disengaged and the power would have been only transmitted to the right hand sprocket and drive chain, causing the machine to turn in the opposite direction.

It will be understood, of course, that both in a forward or rearward movement of the tractor, but in a straight path, both of the clutches 40 and 41 will be engaged, the rocker arm remaining in the position as shown in Fig. 5, and to turn one of the clutches only is to be disengaged, and the one depending on the direction in which it is desired to turn.

It is also to be noticed that the teeth of the clutches 40 and 41 are greater in width than the teeth of the pinions 38 and 39, mounted on the end of the stub axle, so that even though the clutches are moved laterally the respective teeth of the clutches always remain in mesh with the teeth of the said pinions.

The operation of the machine is as follows: The lever D is first moved to operate the clutch 12 so that the same will be disengaged thereby permitting the lever E to be first thrown into locking position with the low-speed sprocket 14 which in turn will transmit motion through the sprocket chain to the low speed sprocket 17 thereby causing the propeller shaft 15ª to revolve at a relatively low rate of speed the power being transmitted through the propeller shaft 15ª and pinion 18 to the transmission gears 19 and 20. The handle B is then moved to lock the interposed jaw clutch 30 with the transmission gear 19 thereby causing the power to be transmitted to the shaft 21, causing it to revolve in the direction of the arrow. This shaft being provided with two pinions 38 and 39 at its opposite ends transmits the power through the two clutches 40 and 41, thereby revolving the stub axles 42 which are provided with the pinions 48 and 49 at their outer ends which in turn mesh with the large drive gears 50 and 51 to which are secured the sprocket wheels 53 and 54 which thereby drive the traction chains 55. The handle D may be again operated to throw out the clutch 12 and the lever E then moved over so that its jaw will engage the high-speed sprocket so that the propeller shaft 15ª will revolve at greater speed, thereby causing the transmission gears to travel at a greater rate of speed which in turn causes the shaft 21 to likewise revolve in like manner transmitting the power to the stub axles through the clutch and finally to the traction chains.

Supposing now it is desired to turn to the right (Fig. 3), the handle A will be forced downwardly to the right which will in turn force the upper end of lever 77 to the right which will in turn cause the rock shaft 74 to force the rocker arm 75 to the left, which in turn will pull the yoke rod 70, which in turn will disengage the teeth 86 from the teeth 87 on the keyed portion of the clutch thereby permitting the outer portion of the clutch only to revolve which in turn prevents any power being transmitted to the stub axle 42 and likewise the sprocket 53 and the traction chain 55 on that side.

After the turn has been made it is only necessary to again move the handle A to its upright and normal position and both clutches 40 and 41 will again be thrown into mesh thereby causing the machine to move in a straight path.

To cause the machine to turn to the left, of course the handle A is moved in the opposite direction, and the same steps are gone through with the exception that this time the clutch 41 at the left hand side is disengaged rather than the one on the right hand side.

To reverse the machine the clutch lever D will first be operated and then the handle B will be operated which in turn will move the interposed clutch member 30 between the bevel gears to unlock with 19 and to lock with the opposite transmission gear 20 thereby causing the shaft 21 to revolve in the opposite direction and the high and low speed selective lever E will then first be thrown into engagement with the low speed sprocket, and if it is desired to reverse at a greater rate of speed it may be thrown into the higher one after the clutch lever D has first been operated.

From the foregoing it will be seen that to steer in either direction it is only necessary to disengage one of the clutches as desired; that in a straight forward movement both clutches are engaged; and that to reverse the machine it is only necessary to lock the other of the transmission gears 20 with the shaft 21, it of course unlocking from 19.

In practice I have found that a tractor being provided with the above mentioned steering and traction driving means is one of simple and flexible operation and quickly and readily steered in any and all directions; one that may be driven in a forward or rearward direction at high or low speeds, and with the manipulation of but a few levers, in fact but one lever controlling the direction of the machine, one lever controlling both the forward and rearward movement, and another lever for determining the rate of speed.

Many slight changes may be made without in any way departing from the spirit and scope of my invention.

Having thus described the preferable form of my invention, what I claim as new and desire to secure by Letters Patent is:

1. A traction steering and driving mechanism for track laying tractors, comprising a propeller shaft, a cross shaft having transmission gears loosely mounted on said shaft and means for selectively locking either of said gears to said cross shaft, pinions mounted on the ends of said cross shaft, stub axles each having a pinion mounted on their outer ends and a clutch mounted on their inner ends, a portion of which is locked on the said stub axles and the other portion of each clutch being loosely mounted on its said stub axle and in mesh with the pinions on the cross shaft, means for normally holding the clutches in their locked position on said stub axles, and means for selectively releasing either clutch to thereby cause the tractor to turn.

2. A traction driving and steering mechanism for track laying tractors comprising a propeller shaft, a cross shaft having transmission gears loosely mounted thereon and means for locking either of them to said shaft to thereby regulate the forward and rearward direction of the tractor, pinions mounted on the ends of said cross shaft, stub axles having pinions mounted on their outer ends and internal clutches on their inner ends, driving gears having driving sprockets associated therewith said internal clutches and said driving gears normally in driving relation, a rock shaft connected to both of said clutches and means for operating said rock shaft to thereby disengage one of said clutches from its driving relation with the drive gear to thereby turn the tractor as desired.

3. A traction driving and steering mechanism for a track laying tractor comprising a propeller shaft, a cross shaft and transmission means connecting the two said shafts whereby the cross shaft may be revolved in either direction as desired, pinions mounted on the outer ends of said cross shaft, stub axles having pinions mounted on their outer ends and internal clutches on their inner ends, driving gears and sprockets associated therewith, said driving gears and said internal clutches normally in driving relation when the tractor is moving in a straight path, a rock shaft, a yoke member extending from each of said internal clutches and connected to said rock shaft, and means for rocking said shaft to thereby release one of said clutches and thereby cause the tractor to turn about the idle drive gear and sprocket.

4. A traction driving and steering mechanism for a track laying tractor comprising a propeller shaft and means for varying the speed of the same, a cross shaft, transmission gears located thereon and operated by said propeller shaft, and means for locking one of said gears at a time to said cross shaft to thereby control the forward and rearward direction of the tractor, pinions mounted on the outer ends of said cross shaft, stub axles having pinions mounted on their outer ends and internal clutches on their inner ends, driving gears and sprockets for driving the tractor, said gears and internal clutches normally in driving relation when the tractor moves in a straight path and a rock shaft having an arm secured thereto provided with an opening, yoke rods loosely fitting within said opening and each extending to one of said clutches, means for rocking said arm to thereby pull one of said yoke bars at the one time to thereby release one of the clutches from driving position and thereby turn the tractor.

5. A traction driving and steering mechanism for track laying tractors comprising a shaft, a propeller shaft and means connecting the two shafts whereby the rate of speed of the propeller shaft may be varied, a cross shaft and means connecting the propeller shaft and cross shaft whereby the direction of the revolutions of the cross shaft may be changed, pinions on the ends of said cross shaft, stub axles provided with pinions at their outer ends and internal clutches at their inner ends, the outer portion of said internal clutches always remaining in mesh with said first mentioned pinions, driving gears connected to main driving sprockets and said drive gears always in mesh with the second mentioned pinions, each of said internal clutches having one portion keyed to its stub axle and one part free to revolve on said axle, a spring in each clutch for normally holding its two parts in driving relation, a rock shaft having a rock arm thereon, rods extending from each of said clutches into said rock arm and means for rocking said arm to thereby pull either of said clutches from its driving position thereby leaving traction on but one side of the tractor causing it to turn about the idle side.

In testimony whereof I affix my signature.

CHARLES E. FOOTE.